United States Patent [19]
Duggan

[11] Patent Number: 5,601,494
[45] Date of Patent: Feb. 11, 1997

[54] END FITTING HAVING ADHESIVE CHANNELS FOR DRIVE SHAFT ASSEMBLY

[75] Inventor: James A. Duggan, Temperance, Mich.

[73] Assignee: Dana Corporation, Toledo, Ohio

[21] Appl. No.: 251,505

[22] Filed: May 31, 1994

[51] Int. Cl.⁶ ........................................ F16C 3/00
[52] U.S. Cl. ............................. 464/182; 464/183
[58] Field of Search ..................... 464/128, 130, 464/135, 175, 172, 181, 182, 183; 403/359, 298

[56] References Cited

U.S. PATENT DOCUMENTS

| | | |
|---|---|---|
| 4,259,382 | 3/1981 | Schwan . |
| 4,275,122 | 6/1981 | Fisher . |
| 4,279,275 | 7/1981 | Stanwood et al. . |
| 4,348,874 | 9/1982 | Müller et al. ............ 464/182 X |
| 4,358,284 | 11/1982 | Federmann et al. ............ 464/183 X |
| 4,451,245 | 5/1984 | Hornig et al. . |
| 4,523,554 | 6/1985 | Ryu . |
| 4,915,536 | 4/1990 | Bear et al. ............ 464/182 X |
| 4,932,924 | 6/1990 | Löbel ............ 464/182 X |
| 4,952,195 | 8/1990 | Traylor ............ 464/183 X |
| 5,222,915 | 6/1993 | PetRzelka et al. ............ 464/182 X |
| 5,230,661 | 7/1993 | Schreiber et al. ............ 464/182 X |
| 5,320,579 | 6/1994 | Hoffmann ............ 464/183 X |

Primary Examiner—Daniel P. Stodola
Assistant Examiner—Eileen A. Dunn
Attorney, Agent, or Firm—MacMillan, Sobanski & Todd

[57] ABSTRACT

A structure for connecting an end fitting formed from a metallic material to a hollow cylindrical drive shaft tube formed from a composite material is disclosed. The drive shaft tube has an open end and an inner cylindrical surface. The end fitting includes a cylindrical sleeve portion having an outer circumferential surface which is formed having a plurality of longitudinally extending channels. An adhesive material, such as epoxy, is applied either to the outer circumferential surface of the sleeve or to the inner cylindrical surface of the bore of the drive shaft. Then, the sleeve portion of the end fitting is inserted within the drive shaft tube, with the outer surface of the sleeve portion engaging the inner cylindrical surface of the drive shaft tube in a light press relationship. The adhesive material flows into the channels between the sleeve portion of the end fitting and the inner cylindrical surface of the drive shaft. The adhesive material is cured to form an adhesive bond between the channels in the sleeve and the inner cylindrical surface of the bore of the drive shaft.

12 Claims, 2 Drawing Sheets

END FITTING HAVING ADHESIVE CHANNELS FOR DRIVE SHAFT ASSEMBLY

BACKGROUND OF THE INVENTION

This invention relates in general to vehicle drive shaft assemblies and in particular to an improved structure and method for manufacturing a drive shaft assembly from a drive shaft tube formed from a composite material and an end fitting formed from a metallic material.

In many different types of vehicles, a drive shaft assembly is utilized to transmit rotational power from a source, such as an engine, to a driven component, such as a pair of wheels. A typical vehicle drive shaft assembly includes a hollow cylindrical drive shaft tube having an end fitting secured to each end thereof. Usually, the end fittings are embodied as end yokes which are adapted to cooperate with respective universal joints. For example, a drive shaft assembly of this general type is often used to provide a rotatable driving connection between the output shaft of a vehicle transmission and an input shaft of an axle assembly for rotatably driving the vehicle wheels.

In the past, both the cylindrical drive shaft tube and the two end fittings have been formed from a metallic material, such as steel. Steel end fittings are relatively easy to weld to a steel drive shaft tube, and the welded connection is effective for transmitting the torque loads normally encountered during vehicle use through the drive shaft assembly. However, such steel components are relatively heavy and, therefore, undesirably add weight of the vehicle. To address this, it is known to form the cylindrical drive shaft tube from a fiber reinforced composite material, such as carbon graphite or fiber glass reinforced synthetic resin. These composite materials are substantially lighter than steel, but still possess the strength and durability for transmitting the torque loads normally encountered during vehicle operation.

Unfortunately, because of the differences in the respective materials, it has been found to be somewhat difficult to provide a sufficiently strong connection between a drive shaft tube formed from a composite material and an end fitting formed from a metallic material. A number of structures and methods are known in the art for providing such a connection. For example, it is known to use an adhesive material to secure the metallic end fitting within the composite drive shaft tube. The use of adhesives alone, however, has not been found to be completely satisfactory. Alternatively, it is known to provide a tight friction engagement between the metallic end fitting and the composite drive shaft tube, and to reinforce this frictional engagement with a compression ring secured thereabout. While effective, this structure involves relatively tight tolerances and additional parts, increasing cost and complexity. Thus, it would be desirable to provide an improved structure and method for connecting a metallic end fitting to a composite drive shaft tube which is strong and durable, and which is relatively easy and inexpensive to construct.

SUMMARY OF THE INVENTION

This invention relates to an improved structure and method for connecting an end fitting formed from a metallic material to a hollow cylindrical drive shaft tube formed from a composite material. The drive shaft tube has an open end and an inner cylindrical surface. The end fitting includes a cylindrical sleeve portion having an outer circumferential surface which is formed having a plurality of longitudinally extending channels. An adhesive material, such as epoxy, is applied either to the outer circumferential surface of the sleeve or to the inner cylindrical surface of the bore of the drive shaft. Then, the sleeve portion of the end fitting is inserted within the drive shaft tube, with the outer surface of the sleeve portion engaging the inner cylindrical surface of the drive shaft tube in a light press relationship. The adhesive material flows into the channels between the sleeve portion of the end fitting and the inner cylindrical surface of the drive shaft. The adhesive material is cured to form an adhesive bond between the channels in the sleeve and the inner cylindrical surface of the bore of the drive shaft.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
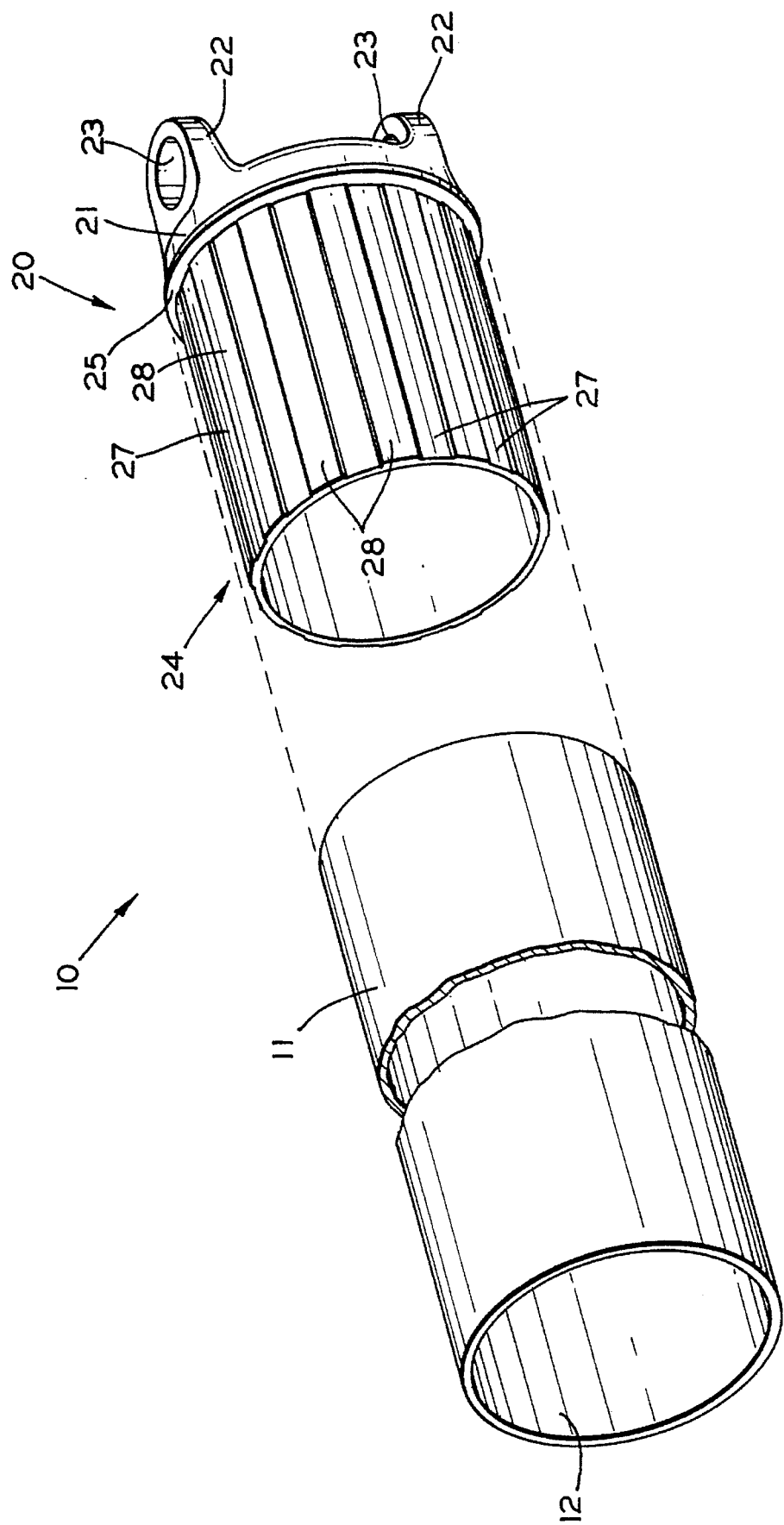
FIG. 1 is an exploded perspective view of a drive shaft assembly in accordance with this invention, including a drive shaft tube formed from a composite material and a end fitting formed from a metallic material.
Figure 2:
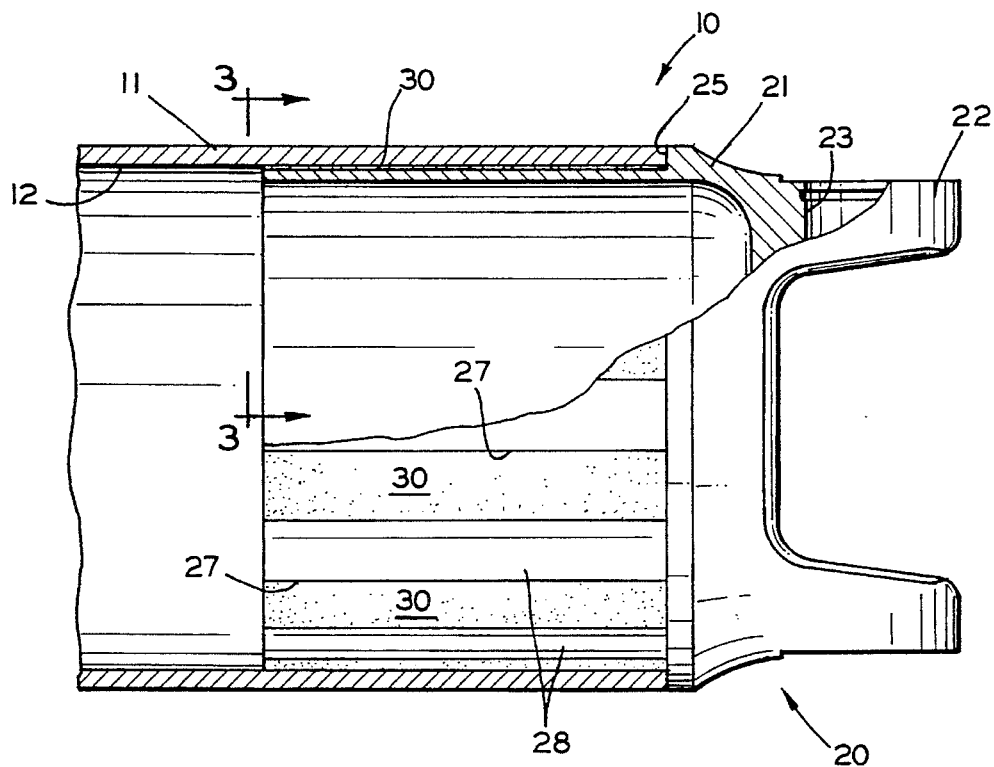
FIG. 2 is a plan view, partially in cross section, of the drive shaft assembly illustrated in FIG. 1 shown assembled.

Referring now to the drawings, there is illustrated in FIGS. 1 and 2 a vehicular drive shaft assembly, indicated generally at 10, in accordance with this invention. The drive shaft assembly 10 includes a hollow cylindrical drive shaft tube 11 having a pair of open ends and an inner cylindrical surface 12. The drive shaft tube 11 is conventional in the art and is preferably formed from a suitable composite material. For example, the drive shaft tube 11 may be formed from a resin, such as an epoxy or a phenolic resin, which is reinforced with a plurality of high strength and high modulus fibers, such as carbon graphite or fiber glass.

An end fitting, indicated generally at 20, is secured to one or both ends of the drive shaft tube 11. The end fitting 20 may, for example, be embodied as an end yoke of a universal joint assembly, as shown in the drawings. However, the end fitting 20 may alternatively be embodied as a stub shaft, companion flange, or other known torque transmitting end fitting. The end fitting 20 is preferably formed from a suitable metallic material, such as steel or aluminum. The end fitting 20 includes a body 21 having a pair of yoke arms 22 extending longitudinally therefrom. The yoke arms 22 have respective aligned bores 23 formed therethrough which are adapted to receive bearing cups (not shown) of a conventional universal joint cross assembly, as is well known in the art.

Figure 3:
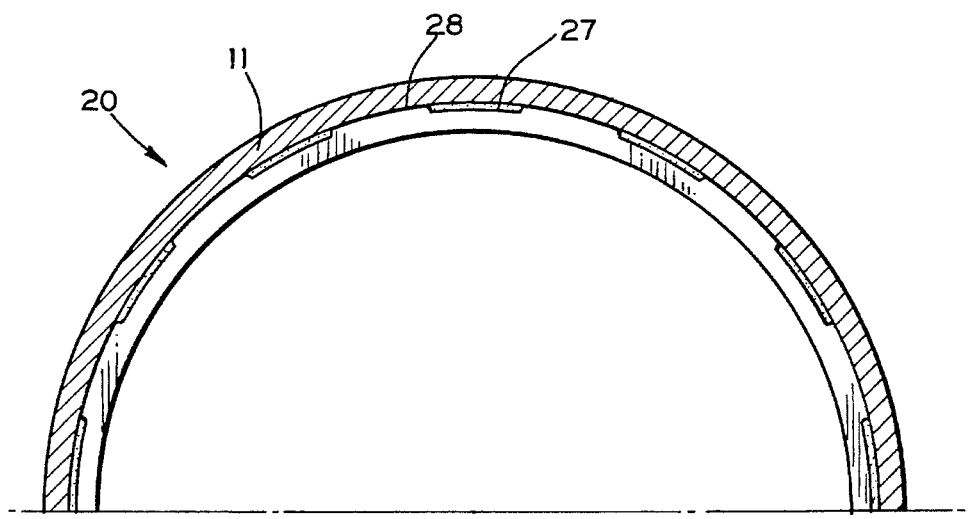
FIG. 3 is a sectional elevational view taken along line 3—3 of FIG. 2.
Figure 4:
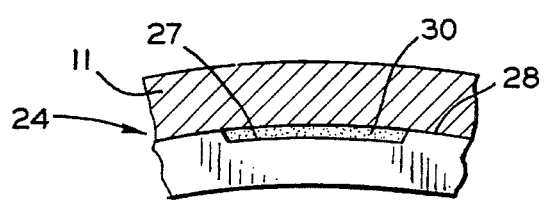
FIG. 4 is an enlarged end view of a portion of the metallic end fitting illustrated in FIGS. 1 through 3.

The end fitting 20 further includes a hollow cylindrical sleeve portion 24 which extends longitudinally from the body 21 in the opposite direction from the yoke arms 23. The outer diameter of the sleeve portion 24 is somewhat smaller than the outer diameter of the body 21. Thus, an external annular shoulder 25 is defined between the body 21 of the end fitting 20 and the sleeve portion 24. As best shown in FIGS. 1, 3, and 4, the outer circumferential surface of the sleeve portion 24 has a plurality of longitudinally extending channels 27 formed therein. The channels 27 are preferably cut or otherwise machined into the outer circumferential surface of the sleeve portion 24 of the end fitting 20. Preferably, the channels 27 are equally sized and equally spaced apart from one another so as to define a corresponding plurality of longitudinally extending lands 28 therebetween. Each of the channels 27 is formed having a radial depth which is preferably not more than approximately 0.050 inch, and is more preferably formed having a radial depth in the range of from 0.005 inch to about 0.015 inch. The longitudinal lengths of the channels 27 are preferably relatively large as compared with their width. For example, each of the channels 27 may have a width of approximately 0.50 inch and a longitudinal length of approximately 3.50 inches. Such dimensions would define a ratio of 7:1 for the longitudinal length of the channel to the width of the channel.

To install the metallic end fitting 20 onto one end of the composite drive shaft tube 11, a quantity of an adhesive material 30 is initially applied to either the outer circumferential surface of the sleeve portion 24 or the inner cylindrical surface 12 of the drive shaft tube 11. Preferably, however, the adhesive material 30 is applied to the outer circumferential surface of the sleeve portion 24. The adhesive material 30 is applied in an amount which is at least sufficient to substantially fill the channels 27 formed in the outer circumferential surface of the sleeve portion 24.

The cylindrical sleeve portion 24 of the end fitting 20 is then inserted within the open end of the hollow drive shaft tube 11. The outer diameter of the cylindrical sleeve portion 24 of the end fitting 20, as defined by the lands 28, is slightly larger than the inner diameter of the composite drive shaft tube 11, as defined by the inner cylindrical surface 12. Thus, when the drive shaft assembly 10 is inserted within the open end of the drive shaft tube 10, the lands 28 engage the inner cylindrical surface 12 of the drive shaft tube 11 in a light press fit relationship. This light press fit engagement facilitates the longitudinal alignment of the sleeve portion 24 of the end fitting 20 and the drive shaft tube 11. The sleeve portion 24 of the end fitting 20 is inserted within the drive shaft tube 10 until the leading edge thereof abuts the annular shoulder 25 provided on the end fitting 20.

As the sleeve portion 24 of the end fitting 20 is inserted within the open end of the drive shaft tube 11, the adhesive material 30 is forced into and substantially fills the channels 27. The adhesive material 30 is then allowed to set or cure to form a plurality of adhesive bonds between the outer circumferential surface of the sleeve portion 24 and the inner cylindrical surface 12 of the composite drive shaft tube 11. The bonds formed by the adhesive material 30 provide for the transmission of torque between the end fitting 20 and the drive shaft tube 11.

A number of adhesives are known in the art for effectively bonding the metallic end fitting 20 to the composite drive shaft tube 11. A two-part epoxy resin adhesive is preferred. Examples of suitable epoxy resin adhesives include the MAGNABOND 95-062 and 95-147 adhesives, commercially available from Magnolia Plastics of Chamblee, Ga.

Although this invention has been described and illustrated in the context of a metallic end fitting 20 connected to a composite drive shaft tube 11, it will be appreciated that the structure and method of this invention can applied when the end fitting 20 and drive shaft tube 11 are formed from materials other than discussed above. Similarly, the structure and method of this invention can also applied when the end fitting 20 and drive shaft tube 11 are formed from the same material.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A drive shaft assembly comprising:

a hollow drive shaft tube having an open end and an inner surface defining an inner dimension;

an end fitting including a body and a sleeve portion extending from said body, said sleeve portion having an outer surface defining an outer dimension which is slightly larger than said inner dimension, said outer surface having a channel formed therein, said sleeve portion being disposed within said drive shaft tube such that said outer surface of said sleeve portion of said end fitting frictionally engages said inner surface of said drive shaft tube; and an adhesive material provided in said channel to form a permanent adhesive bond between said sleeve portion and said inner surface of said drive shaft tube.

2. The drive shaft assembly defined in claim 1 wherein said outer surface of said sleeve portion engages said inner surface of said shaft in a light press fit relationship.

3. The drive shaft assembly defined in claim 1 wherein said channel has a radial depth which does not exceed 0.050 inch.

4. The drive shaft assembly defined in claim 1 wherein said channel has a radial depth of between 0.005 inch to 0.015 inch.

5. The drive shaft assembly defined in claim 1 wherein said outer surface has a plurality of channels formed therein, said adhesive material being provided in each of said channels between said outer surface of said sleeve portion and said inner surface of said shaft to form an adhesive bond therebetween.

6. The drive shaft assembly defined in claim 1 wherein said end fitting is formed from aluminum.

7. The drive shaft assembly defined in claim 1 wherein said end fitting is formed from steel.

8. The drive shaft assembly defined in claim 1 wherein said drive shaft tube is formed from a composite material.

9. The drive shaft assembly defined in claim 1 wherein said adhesive material is formed from epoxy.

10. The drive shaft assembly defined in claim 1 wherein said channel has a length which is relatively large as compared to its width.

11. The drive shaft assembly defined in claim 1 wherein said channel has a length of about 3.5 inches and a width of about 0.5 inches.

12. The drive shaft assembly defined in claim 1 wherein said channel has a length to width ratio of about 7:1.

* * * * *